United States Patent
Goeller et al.

(10) Patent No.: US 12,407,843 B2
(45) Date of Patent: Sep. 2, 2025

(54) METHOD FOR DYNAMIC VIDEO COMPRESSION IN AN AD DELIVERY ECOSYSTEM

(71) Applicant: Euclid Discoveries, LLC, Cambridge, MA (US)

(72) Inventors: Kenneth Goeller, Los Angeles, CA (US); Christopher Weed, Sudbury, MA (US); Richard Y. Wingard, Carlisle, MA (US); Caroline Wingard, Arlington, MA (US)

(73) Assignee: Euclid Discoveries, LLC, Cambridge, MA (US)

( * ) Notice: Subject to any disclaimer, the term of this patent is extended or adjusted under 35 U.S.C. 154(b) by 62 days.

(21) Appl. No.: 18/411,287

(22) Filed: Jan. 12, 2024

(65) Prior Publication Data
US 2024/0244243 A1 Jul. 18, 2024

Related U.S. Application Data

(60) Provisional application No. 63/479,944, filed on Jan. 13, 2023.

(51) Int. Cl.
*H04N 19/426* (2014.01)
*G06Q 30/0273* (2023.01)
*H04N 21/81* (2011.01)

(52) U.S. Cl.
CPC ....... *H04N 19/428* (2014.11); *G06Q 30/0275* (2013.01); *H04N 21/812* (2013.01)

(58) Field of Classification Search
CPC . H04N 19/428; H04N 21/812; G06Q 30/0275
(Continued)

(56) References Cited

U.S. PATENT DOCUMENTS

| 10,757,419 B2 | 8/2020 | Kottke et al. |
| 11,159,801 B2 | 10/2021 | Kottke et al. |

(Continued)

FOREIGN PATENT DOCUMENTS

| WO | 2010/134127 A1 | 11/2010 |
| WO | 2018/140158 A1 | 8/2018 |
| WO | 2024/151938 A1 | 7/2024 |

OTHER PUBLICATIONS

IAB "Video Ad Serving Template (VAST) Version 4.0." In: Interactive Advertising Bureau, Nov. 2, 2015, 21 pages.
(Continued)

*Primary Examiner* — Cynthia M Fogg
(74) *Attorney, Agent, or Firm* — Hamilton, Brook, Smith & Reynolds, P.C.

(57) ABSTRACT

Example embodiments of the disclosure may provide a recompressor system that configures dynamic Video Ad Serving Template (VAST) tags enabling seamless delivery of mezzanine-level quality video ads of the highest resolution compatible with the user's system requirements. Aspects of the disclosure relate to reprocessing of received VAST tag, parsing the tag to identify the location of the video of highest resolution, accessing the video of highest resolution and forwarding it to a compression engine (Euclid's in this case). Compression engine re-compresses video in one or more formats and sends back location(s) of the videos. Receiving back one or more video locations and an updated VAST tag and forwarding that.

18 Claims, 6 Drawing Sheets

(58) Field of Classification Search
USPC .......................................................... 725/35
See application file for complete search history.

(56) References Cited

U.S. PATENT DOCUMENTS

| | | |
|---|---|---|
| 11,350,105 B2 | 5/2022 | Kottke et al. |
| 2011/0231242 A1 | 9/2011 | Dilling et al. |
| 2016/0249085 A1* | 8/2016 | Ben-Atiya ....... H04N 21/85406 |
| 2017/0193563 A1 | 7/2017 | Kumar et al. |
| 2017/0295386 A1 | 10/2017 | Owen et al. |
| 2021/0168472 A1 | 6/2021 | Monaco et al. |

OTHER PUBLICATIONS

International Search Report and Written Opinion received for PCT Patent Application No. PCT/US2024/011381, mailed on Jun. 11, 2024, 13 pages.

* cited by examiner

METHOD FOR DYNAMIC VIDEO COMPRESSION IN AN AD DELIVERY ECOSYSTEM

RELATED APPLICATION(S)

This application claims the benefit of U.S. Provisional Application No. 63/479,944, filed on Jan. 13, 2023, the entire teachings of which are incorporated herein by reference.

This application incorporates by reference the entire teachings and disclosures of U.S. application Ser. No. 17/144,924, filed Jan. 8, 2021, now U.S. Pat. No. 11,350, 105, issued May 31, 2022, which is a continuation of U.S. application Ser. No. 16/926,089, filed Jul. 10, 2020, now U.S. Pat. No. 11,159,801 issued Oct. 26, 2021, which is a continuation of U.S. application Ser. No. 16/420,796, filed May 23, 2019, now U.S. Pat. No. 10,757,419, issued Aug. 25, 2020, which is a continuation-in-part of International Application No. PCT/US2017/067413, which designated the United States and was filed on Dec. 19, 2017, and which claims the benefit of U.S. Provisional Application No. 62/452,265 filed on Jan. 30, 2017.

The entire teachings of the above referenced applications are incorporated herein by reference.

TECHNICAL FIELD

The present disclosure relates to video compression of advertisements and the preparation of extensible markup language (XML), markup codes, scripting codes and control programing languages within an advertising ecosystem. These methods are also applicable to general video streaming content on the internet.

BACKGROUND

Video compression can be considered the process of representing digital video data in a form that uses fewer bits when stored or transmitted. Video encoding can achieve compression by exploiting redundancies in the video data, whether spatial, temporal, or color-space. Video compression processes typically segment the video data into portions, such as groups of frames and groups of pels, to identify areas of redundancy within the video that can be represented with fewer bits than required by the original video data. When these redundancies in the data are exploited, greater compression can be achieved. An encoder can be used to transform the video data into an encoded format, while a decoder can be used to transform encoded video back into a form comparable to the original video data. The implementation of the encoder/decoder is referred to as a codec.

Online advertising buyers and sellers use multiple protocols to describe and communicate, transact, manage, compress and deliver online video data. Online buyers, for example, may compress their video advertisements in various formats before adding them to an advertising network so that they are playable on a variety of devices, including televisions, mobile phones, tablets, watches, and computers. Buyers often take a generic approach to setting the video settings, as a result, the advertisement is not optimized for the device receiving and playing the advertisement. This is because consumer devices differ in screen size, computational capabilities and supported protocols.

SUMMARY

Embodiments of the present disclosure can provide mezzanine compression that reduces the video bitrate (bandwidth) for encoded video ads. Aspects of the disclosure can enable encoded video-based ads to be customized for performance. In some embodiments, the video-based ads can be customized for specific devices and/or for specific bandwidth conditions. In some embodiments, the video-based ads can be customized for optimal performance.

A content delivery network (CDN) may be a cluster of geographically distributed servers that speed up the delivery of web content by bringing it closer to where users are. Data centers across the globe use caching, a process that temporarily stores copies of files, so that a client device can access internet content from a web-enabled device or browser more quickly through a server that is in a relatively close geographic location as the client device. CDNs cache content including web pages, images, videos, and ad in proxy servers near to the client device's physical location to improve content delivery speed at the client device.

Advertisers use a protocol to manage, describe, communicate, bid, and transmit video advertisements. Two popular protocols for this among buyers, ad networks, sellers, bidders, and delivery networks are VAST (Video Ad Serving Template) and VPAID (Video Player-Ad Interface Definition). This present disclosure describes the methods for dynamically adjusting video settings and for dynamically updating the VAST and VPAID for each impression.

Example embodiments herein provide techniques for providing video advertisements in different formats and sizes before and after they have been introduced into the digital ad ecosystem. A method for video compression through VAST and VPAID processing, based on marked up languages or scripting languages and digital video streams, to change the stream size, viewing quality, and format of a video. A VAST URL is passed to the new method, and the ad video streams are reprocessed into a new format, and the existing VAST and VPAID data elements are preserved and presented to the device so that all the tracking information is preserved.

One exemplary aspect for the method disclosed is that this method can be applied at the ad server for buyers, or the demand side platform, or the supply side platform, or the ad server for sellers, or the client display device.

In another exemplary aspect for the method disclosed is that the method can transform video ads to a wide variety of formats for a wide variety of devices. Device specific computation and supported video formats features are used to optimize the video format and settings for the targeted consumer device. Optimizing the video format, stream size and frame size maximizes the user experience.

In another exemplary aspect for the method disclosed is that the optimized video format for the device can reduce the probability of network jitter causing buffering and video anomalies.

In another exemplary aspect of the method disclosed is that Brands, Agencies, Ad Networks, Ad Servers, and Demand Side Platforms can stop sending generic device formatted videos to the digital ad ecosystem where this method is implemented. These entities can instead distribute mezzanine-level, high bit rate ad streams to the digital ad ecosystem and let this method prepare ad streams that better match the limits of a network's bandwidth, computational capability of a device and the device's screen size.

Aspects of the disclosure relate to a dynamic reencoding system that intercepts VAST tags and replaces a video pointer address in the VAST tag with an address to a transformed video that improves transmission and/or video quality with respect to the client. A client device may be configured to communicate via a session handler with at least one server in a content delivery network. The at least one server may be configured to deploy a first video encoding for delivery at the client device via a first VAST tag transmitted via the session handler to the client device. A recompressor system may be configured to process the first VAST tag to identify the first video encoding. The recompressor system may be configured to recompress the first video encoding using bitrate encoding quality metrics to dynamically optimize the first video encoding for the client device such that the first video encoding is transformed into a first mezzanine encoding. The recompressor system may be configured to dynamically reconfigure the first VAST tag resulting in a transformed vast tag identifying the first mezzanine encoding while preserving information about the client device from the VAST tag including existing VAST and VPAID data elements so that all tracking information is preserved. The at least one server may be configured to respond to a request to deploy the first video encoding to the client by verifying that the first video encoding is in the video cache of the CDN and responding by forwarding the transformed VAST tag identifying the first mezzanine encoding to the client device via the session handler. The client device may be configured to respond to the transformed VAST tag by processing at least a portion of the first mezzanine encoding via the transformed VAST tag.

In an embodiment, the disclosure provides a dynamic VAST tag encoding system. The system can dynamically rebuild VAST tags to ensure that videos being deployed to a user device are at optimal quality.

In an example implementation, the system may process media loading media on a user device that performs a HTTP GET for an ad from an ad server. A demand side server, optionally, joins an ad auction and bids and wins the auction. The demand side server or a supply side ad server or any server may be configured to transmit video to client devices via calling a recompression server API. That server may be configured to pass a VAST URL to a recompression server, which adds or updates a record in a cache with a key value pair. In response, the recompression server may build and stores a new VAST XML and responds with a new VAST URL to the new VAST XML.

The demand side server or supply side ad server or any server may transmit video fills in URL macro fields. The specified server be configured to respond to the device with a VAST URL. The device may be configured to fill in macros on VAST URL. The device may be configured to fill in the HTTP headers with hardware and software information during a HTTP GET process to send a request to the demand server. The device may perform a HTTP get on the VAST URL with macros. The VAST rewriter server may perform a check of the cache for a compressed ad with a key value pair. The server can be configured to copy macros to original VAST URL so that the demand server may be called. The server responds with original XML and optionally a new ad video. In response, the VAST rewriting server may be configured to process a VAST XML to find the mezzanine URL for recompression.

The VAST rewriting server may be configured to read the cache to get the replacement videos with the mezzanine URL. The VAST rewriting server, in this example scenario, may be configured to determine if there is a cache miss (e.g., determines the cache is empty and therefor a cache miss). The VAST rewriting server responds to the cache miss at the device by passing the original VAST XML and use original VAST XML, not the new VAST XML in this ad request.

The VAST rewriting server performs a message queue to compress the video asynchronously. The recompression server HTTP gets the ad stream to be recompressed to mezzanine quality. The demand content delivery network (CDN) responds with the ad stream and recompression server starts compression of the ad. The recompression server posts the newly compressed ad stream(s) to the CDN. In a further embodiment, the recompression server updates cache with new encoded video data with a key value pair; and the client device performs a HTTP Get ad stream with original ad video, because this is a cache miss scenario; and the device streams the original uncompressed ad; and consumer sees the original ad.

In the dynamic VAST tag encoding system, the VAST XML regenerating process may include original VAST XML data, new VAST XML data, and original video while the new video is recompressed, reformatted, repackaged or transformed from on codec to another to be used in future ad requests.

BRIEF DESCRIPTION OF THE DRAWINGS

The accompanying drawings, which are included to provide further understanding and are incorporated in and constitute a part of this specification, illustrate disclosed embodiments and together with the description explain the principles of the disclosed embodiments in the drawings enclosed.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Typically, buyers of encoded video ads compress their own ads via an ad host server. For example, this can be done using tools, such as Google Analytics 360 digital video or Google Apps Manager (GAM). Google Analytics 360 includes a variety of tools such as: Analytics, Tag Manager, Optimize, Data Studio, Surveys, Attribution, and Audience Center. Video ad compression systems often compress the video data after the content has been introduced to the ad ecosystem and tagged.

Certain example embodiments of the present disclosure include a recompressor system that can enable customized video compression for CSAI (Client-Side Ad Insertion). The recompressor system may provide dynamic device and bandwidth compression optimization based on user device-specific requirements and bandwidth-specific constraints. The recompressor system, for example, may be calibrated to increase ad performance and reduce stream size, buffering and errors, while improving fill rates, load time completion rates, and click-throughs. The recompressor system can enable video compression optimization tailored to devices, codec formats, and player screen dimensions, ultimately resulting in ad deliver of mezzanine-level quality ads. With example embodiments of the recompressor system, publishers can deliver ads from their own content delivery network (CDN), enabling the recompressor system to provide the publishers with optimization to control the ad experience for their customers.

Example embodiments of the disclosure may provide a recompressor system that configures dynamic Video Ad Serving Template (VAST) tags enabling seamless delivery of mezzanine quality video ads of the highest resolution compatible with the user's system requirements. The system may be configured to receive a VAST tag, parse the VAST tag to identify the location of the video of highest resolution, accessing the video of highest resolution and forwarding it to a recompression engine, which re-compresses the video in one or more formats and sends back location(s) of the videos. The system may receive back one or more video locations and an updated VAST tag and forwarding that for dynamic VAST tag reconfiguration.

With example disclosed embodiments, a video recompression system can be configured provide mezzanine compression, while reducing the video bitrate (bandwidth) for encoded video ads. Aspects of the disclosure can enable encoded video-based ads to be customized for performance. In some embodiments, the video-based ads can be customized for specific devices and/or for specific bandwidth conditions. In some embodiments, the video-based ads can be customized for optimal performance.

Example Processes and Systems

Figure 1:
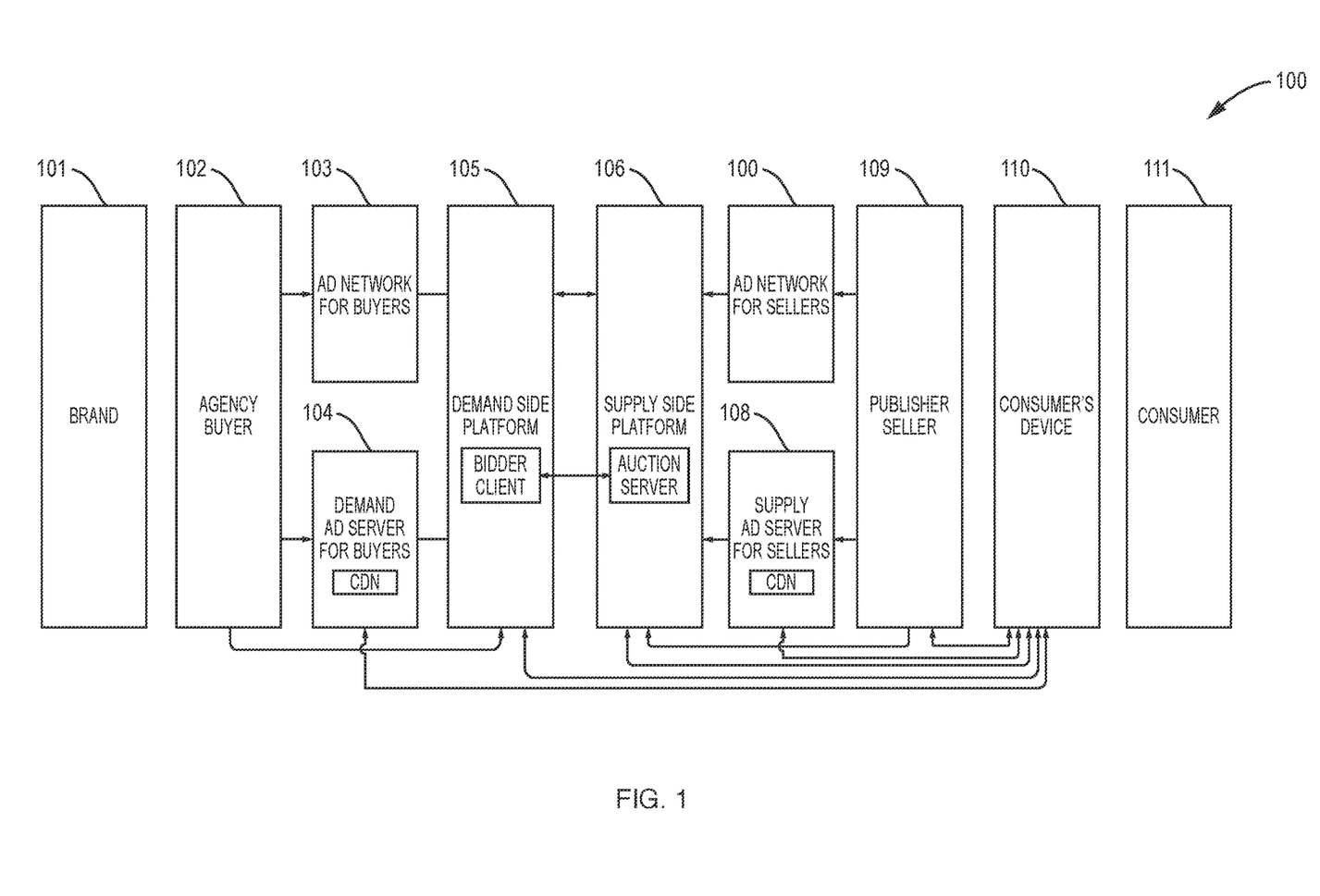
FIG. 1 is an illustration of an example of a high-level architecture for an online video advertisement system according to an embodiment.

FIG. 1 illustrates an example employment of a high-level architecture 100 for an online video advertisement system. The architecture 100 includes the Brand 101 paying for the advertising. The Agency 102 is who is buying the advertising on behalf of a Brand, Agency operations can be contained within a Brand. The Advertisement Network 103 is used by Agencies to purchase advertising. Advertisers use the Advertisement Server 104 for their advertisements. The demand side platform 105 is used by the buyers. Publishers are able to sell advertising via the Advertisement network for sellers 107. Publishers will use the advertisement server for sellers 108. In addition, the architecture 100 includes the publisher 109, the customer's device 110 and the consumer 111.

VAST XMLs and their URLs are used to communicate between the Band 101 through the consumer 111. The methods disclosed are applicable to the Brand 101 through figure the consumer device 110 as described.

Figure 2:
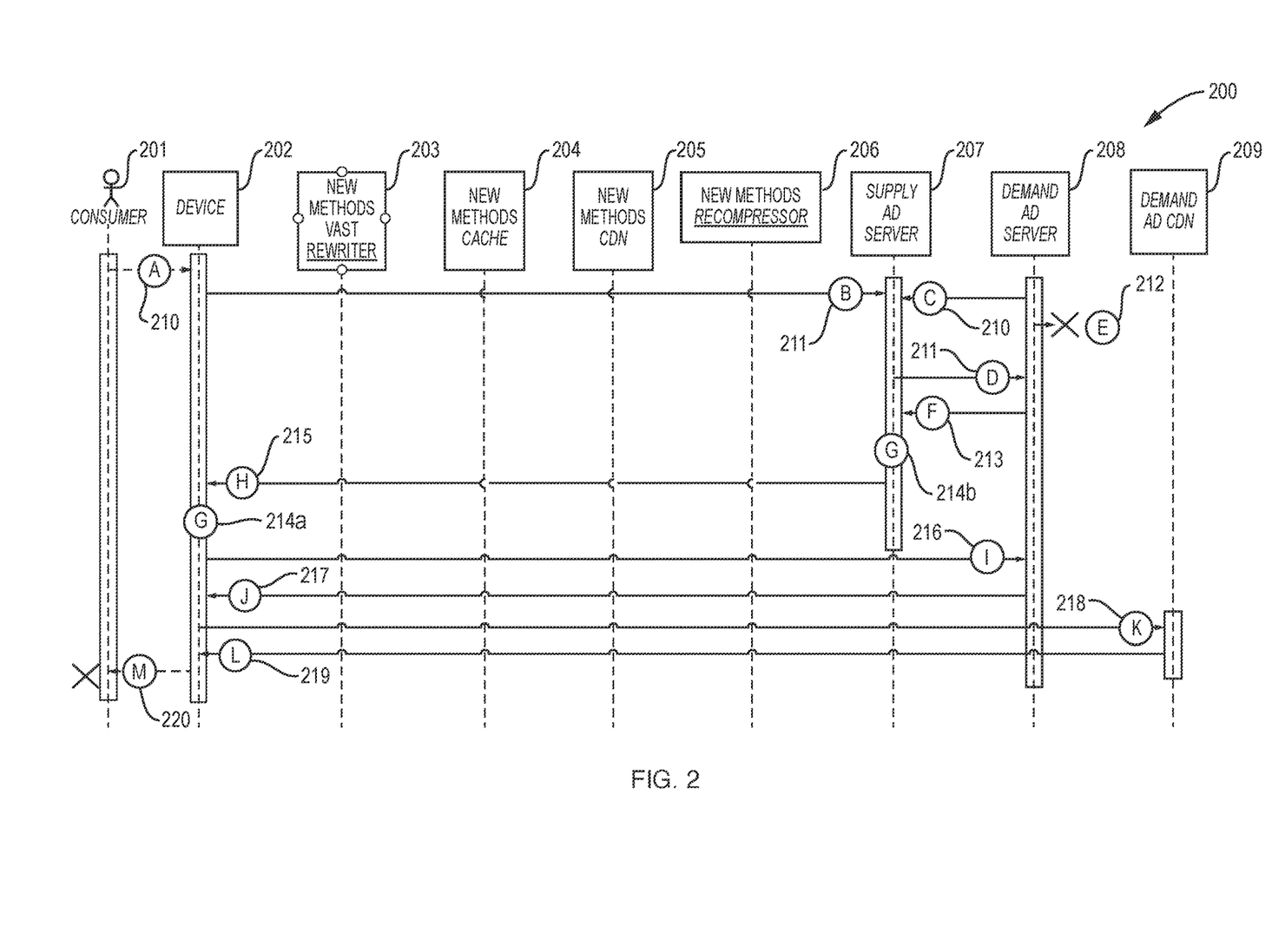
FIG. 2 is an illustration of an example as to how digital advertising works without the disclosed methods according to an embodiment.

FIG. 2 illustrates an architecture 200 depicting how digital advertising works without the disclosed methods. The consumer 201 may use a device 202, this may be any display device with computational abilities and protocol support, including televisions, computers, tablets, phone, and watches the consumer loads a website, or an application, and that calls a publisher's advertisement server. The new methods rewriter 203, the new methods cache for rewriter 204, the new methods content delivery network (CDN) 205, and the new methods recompressor 206, all of which are disclosed herein, are not being used in this scenario. The architecture 200 also includes the supply advertisement server 207, the demand advertisement server 208, and the demand CDN 209.

The architecture 200 depicted in FIG. 2 may include computational processing flow, starting with designation A 210. At process A 210, a consumer loading a page may be computationally processed in an application or in a website. At depiction B 211, the device performs an hypertext transfer protocol (HTTP) GET request 212 for an advertisement from an advertisement supply server. Depiction C 212 indicates a bid on a joined auction. Indication D 213 indicates the win or lose notice of the auction 212. If the auction is lost, depiction E 214 indicates that the bid may be rebid again. If the auction is won, depiction F 215 will send a video advertisement serving template (VAST) uniform resource locator (URL). At depiction G 216a-b, the VAST URL macros are filled in on the server. At depiction H 217, the VAST URL is returned to the device 202. Depiction I 218 fills in additional macros on the VAST UL on the device 202. Next, depiction J 219 returns the VAST XML. Depiction K 220 gets an advertisement stream with an advertisement URL, then depiction L 221 returns the advertisement stream. And lastly, depiction M 222 illustrates that the consumer 201 will view the advertisement stream.

Figure 3:
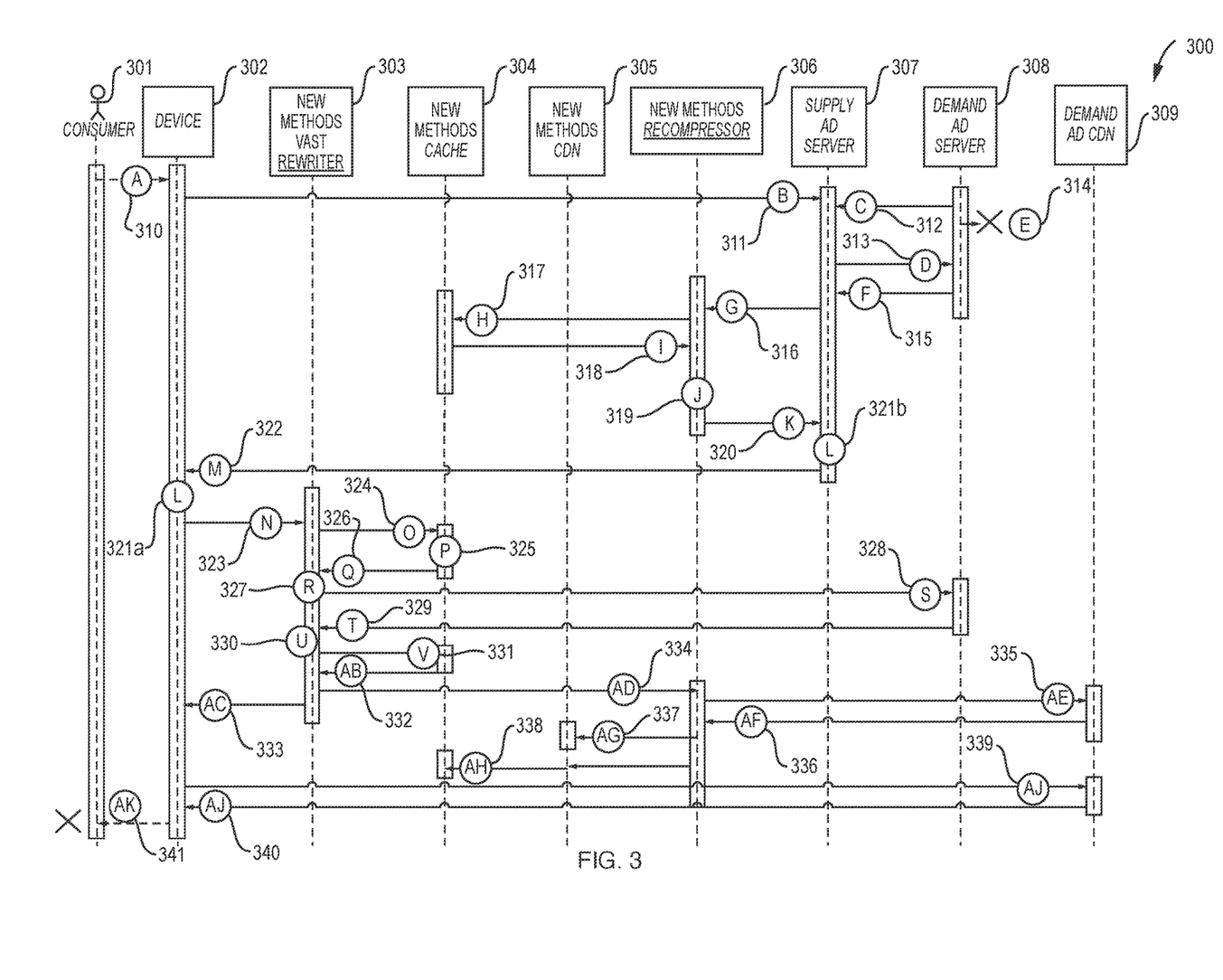
FIG. 3 is an illustration of an example as to how disclosed methods work in a cache miss scenario.

FIG. 3 illustrates an architecture 300 depicting how disclosed methods work in a cache miss scenario. A cache miss occurs when a video advertisement is processed for the first time. The consumer 301 may use a device 302. The device 302 may be any display device with computational abilities and protocol support, including televisions, computers, tablets, phones, and watches. The consumer 301 loads a website, or an application that calls a publisher's advertisement server. The new methods rewriter 303, the new methods cache for rewriter 304, the new methods content delivery network (CDN) 305, and the new methods recompressor 306, all of which are disclosed herein, are not being used in this scenario. The architecture 300 also includes a supply advertisement server 307, a demand advertisement server 308 and a demand CDN 309.

The architecture 300 depicted in FIG. 3 may include processing flow, starting with designation A 310 which indicates a consumer loading a page in an application or in a website. At depiction B 311, the device performs an hypertext transfer protocol (HTTP) GET request 312 for an advertisement from an advertisement supply server. Depiction C 312 indicates a bid on a joined auction. Indication D 313 indicates the win or lose notice of the auction 312. If the auction is lost, depiction E 314 indicates that the auction will stop. If the auction is won, depiction F 315 will send a VAST URL. Depiction G 316 will initiate an application program interface (API) call to the recompressor with null macros. Depiction H 317 puts the customer VAST URL in the cache, and updates it if it is already there. Depiction I 318 indicates a response with EuclidIQ advertisement identification. Depiction J 319 creates a new VAST URL with EuclidIQ Cache universal unique identifier (UUID) and null macros as arguments. Depiction K 320 indicates an API response with a new VAST tag. Depiction L 321a-b fills in the macros, both by the supply advertisement server and the client after the following depiction M 322. Depiction M 322 indicates the EuclidIQ VAST URL returned to the client.

Continuing on FIG. 3, depiction N 323 indicates the HTTP GET VAST URL. Depiction O 324 reads the cache with Cache UUID. Depiction P 235 looks up the identification to get the original VAST URL. Depiction Q 326 returns the cache data and copies the macros to the original VAST URL. Depiction R 327 copies macros from depiction L 321 to the original VAST URL so that the demand server may be called. Depiction S 328 gets the URL. Depiction T 329 is the response with the original XML to find the mezzanine URL, while depiction S 328 is the GET URL. Depiction T 329 is the response with the original XML, with the new advertisement video. Depiction U 330 is the process that the VAST XML uses to find the mezzanine URL. Depiction V 331 reads the cache to get the replacement videos with the mezzanine URL.

Continuing on FIG. 3, depiction AB 332 is the cache data, the cache is empty and therefore indicates a cache miss. Depiction AC 333 is the response to the original VAST XML from depiction T 329, then there is a pass and uses the original VAST XML, not the new VAST XML in this advertisement request. Depiction AD 334 is the message que to compress asynchronously. Depiction AE 335 gets the advertisement stream, while depiction AF 336 is the advertisement stream added, and starting recompression of the advertisement. Depiction AG 337 posts the advertisement stream to the CDN. Depiction AH 338 updates the cache with the new encode video, the cache key is the mezzanine URL. Depiction AI 339 performs a HTTP GET advertisement stream, which is the original advertisement video because this is a cache miss. Depiction AJ 340 streams the original uncompressed advertisement, the URL to the original stream comes from depiction AC 335. Next, depiction AK 341 indicates that the consumer sees the original advertisement. The next advertisement request, at depiction A 310 occurs after the advertisement is done with the compression processing. Depiction AF 336 will have a cache hit.

Figure 4:
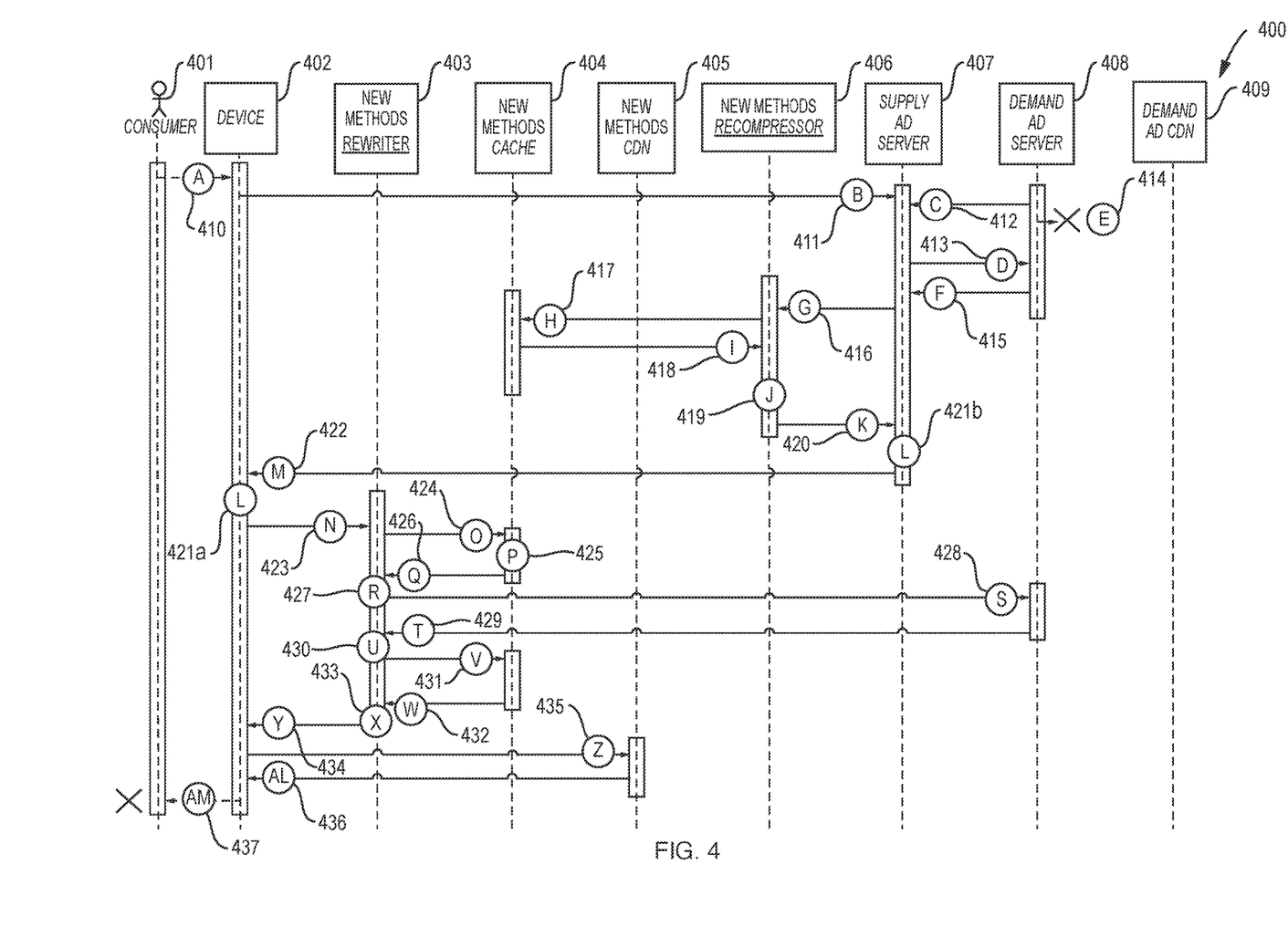
FIG. 4 is an illustration of an example as to how disclosed methods work in a cache hit scenario according to an embodiment.

FIG. 4 illustrates how disclosed methods work in a cache hit scenario. The consumer 401 uses the device 402. This may be any display device with computational abilities and protocol support, including televisions, computers, tablets, phones, and watches. The consumer loads a website, or an application that calls a publisher's advertisement server. The new methods rewriter 403, the new methods cache for rewriter 404, the new methods content delivery network (CDN) 405, and the new methods recompressor 406, all of which are disclosed herein, are not being used in this scenario. The architecture 300 also includes a supply advertisement server 407, a demand advertisement server 408 and a demand CDN 409.

The architecture 400 depicted in FIG. 4 also includes processing flow, starting with designation A 410 which indicates a consumer loading a page in an application or in a website. At depiction B 411, the device performs an hypertext transfer protocol (HTTP) GET request for an advertisement from an advertisement supply server. Depiction C 412 indicates a bid on a joined auction. Indication D 413 indicates the win or lose notice of the auction 412. If the auction is lost, depiction E 414 indicates that the auction will stop. If the auction is won, depiction F 415 will send a VAST URL. Depiction G 416 is the API which calls the ReCompressor with null macros. Depiction H 417 puts customer VAST URL in the cache, and updates it if it is already there. The Cache consists of UUID, VAST with Null Macros. Depiction I 418 is the response with EuclidIQ advertisement identification. Depiction J 419 creates a new VAST URL with EuclidIQ Cache UUID and null macros as arguments. Depiction K 420 indicates the API response with a new VAST URL. Depiction L 421 fulls in macros, both by the supply advertisement server and the client after depiction M 422. Depiction M 442 indicates that the EuclidIQ VAST URL is returned to the client.

Continuing on with FIG. 4, depiction N 423 is the HTTP GET VAST URL request. Depiction O 424 reads the cache with the cache UUID. Depiction P 425 looks up the identification to get the original VAST URL. Depiction Q 426 indicates the return cache data, and copies macros to the original VAST URL. Depiction R 427 copies macros from depiction L 421 to the original VAST URL so that the demand server may be called. Depiction S 428 gets the VAST URL. Depiction T 429 is the response with the original XML with the new advertisement video. Depiction U 430 is the process that the VAST XML uses to find the mezzanine URL. Depiction V 431 reads the cache to get the replacement video with the mezzanine URL. Depiction W 432 returns the cache data. Depiction X 433 rewrites the VAST XML with the replacement video. Depiction Y 434 is the response with the VAST XML. Depiction Z 435 is the HTTP GET request for the advertisement stream. Depiction AL 436 is the streaming advertisement. Next, depiction AM 437 indicates that the consumer sees the recompressed, reformatted, repackaged advertisement that was cached.

Digital Processing Environment

Figure 5:
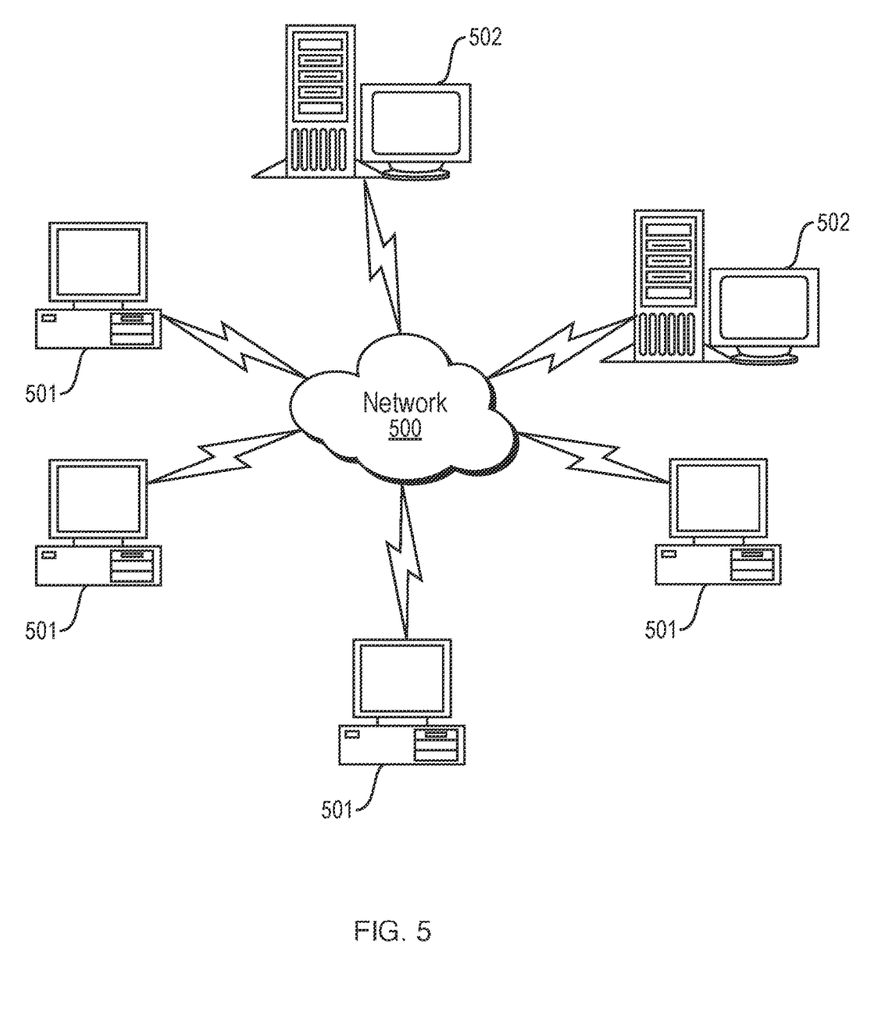
FIG. 5 is a schematic diagram of a computer network environment in which embodiments are deployed according to an embodiment.

Example implementations of the present invention may be implemented in a software, firmware, or hardware environment. FIG. 5 illustrates one such environment. For example, the method/system described above (including FIGS. 1-4) may be implemented in the environment of FIG. 6. Client computer(s)/devices 501 (e.g., mobile phones or computing devices) and a cloud 502 (or server computer or cluster thereof) provide reencoding, VAST tag intercepting, VAST tag reconfiguring, processing, storage, encoding, decoding, and input/output devices executing application programs and the like.

Client computer(s)/devices 501 can also be linked through communications network 70 such as the internet and a content delivery network (CDN) to other computing devices, including other client devices/processes 501 and server computer(s) 502. This communications network framework may include ad networks, ad servers, and demand side platforms, ad server for buyers, or the demand side platform, or the supply side platform, or the ad server for sellers. Communications network 500 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic devices/computer network architectures are suitable.

Figure 6:
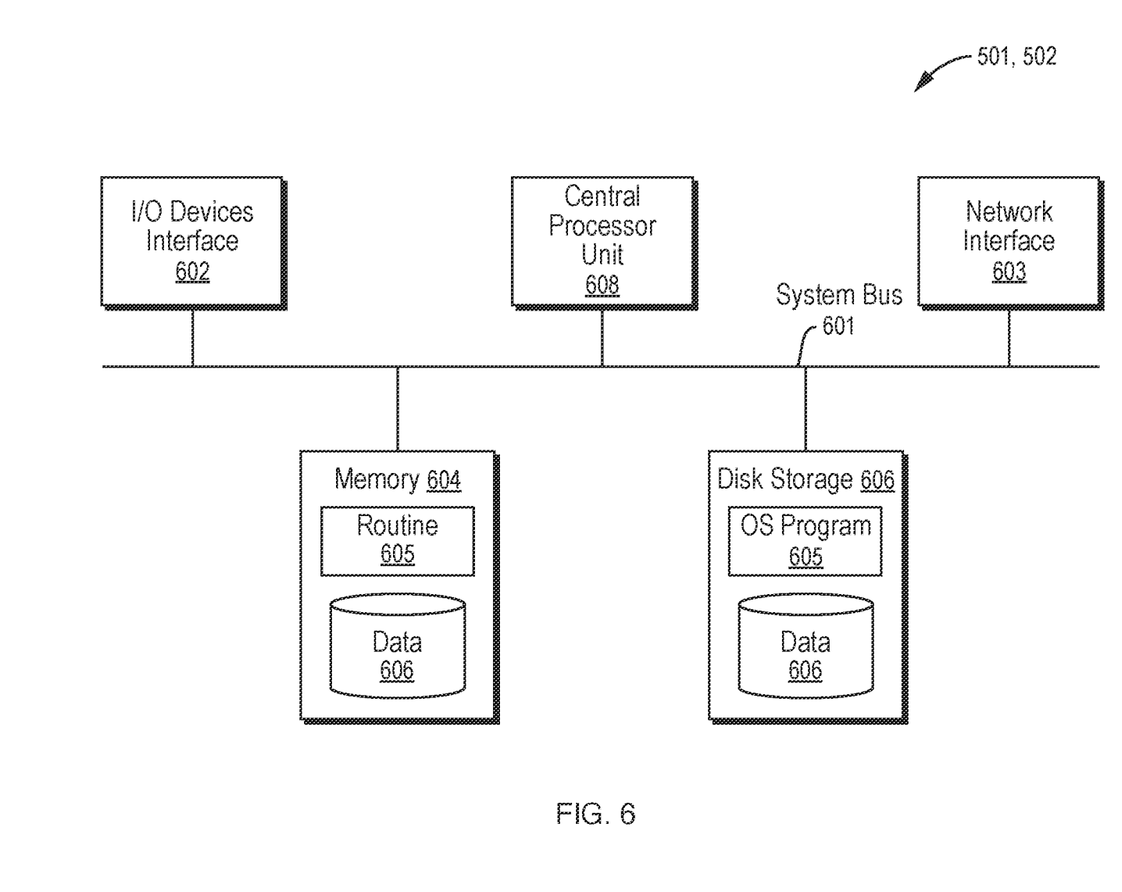
FIG. 6 is a block diagram of the computer nodes in the network of FIG. 5 according to an embodiment.

Embodiments of the invention may include means for reencoding, recompressing, tracking, tracking, VAST tag configuring, modeling, filtering, tuning, decoding, streaming, or displaying video or data signal information. FIG. 6 is a diagram of the internal structure of a computer/computing node (e.g., client processor/device/mobile phone device/tablet 501 or server computers 502) in the processing environment of FIG. 5, which may be used to facilitate encoding such videos or data signal information. For example, method/system described here (including FIGS. 1-4) may be implemented by the computer/computing node of FIG. 6.

Each computer 501, 502 contains a system bus 601, where a bus is a set of actual or virtual hardware lines used for data transfer among the components of a computer or processing system. Bus 601 is essentially a shared conduit that connects different elements of a computer system (e.g., recompressor, processor, encoder chip, decoder chip, disk storage, memory, input/output ports, etc.) that enables the transfer of data between the elements. Attached to the system bus 601 is an I/O device interface 602 for connecting various input and output devices (e.g., keyboard, mouse, displays, printers, speakers, etc.) to the computer 501, 502. Network interface 603 allows the computer to connect to various other devices attached to a network (for example, the network illustrated at 500 of FIG. 5). Memory 604 provides volatile storage for computer software instructions 604 and data 605 used to implement a software implementation of the present invention (e.g., codec: recompressor/encoder/decoder).

Disk storage 606 provides non-volatile storage for computer software instructions 605 (equivalently "OS program") and data 606 used to implement an embodiment of the present invention: it can also be used to store the video in compressed format for long-term storage. Central processor unit 608 is also attached to system bus 601 and provides for the execution of computer instructions. Note that throughout the present text, "computer software instructions" and "OS program" are equivalent.

In one example, a recompressor or other encoding system may be configured with computer readable instructions 606 that implement a method and/or system designed to predict the target (encoding) to deploy to the user device that will provide the fastest rate of transmission to the user device (the consumer/consuming device). In an optional embodiment, an encoder or other recompressor/encoder/decoder system may be configured with computer readable instructions 605 that implement a method and/or designed to select videos from nodes in the content delivery network (CDN) that are in close proximity to speed up transmission to the user device. In another optional example, a recompressor, an encoder or other encoding system may be configured with computer readable instructions 605 that implement a method and/or system designed to determine an optimal subset of perceptual quality metrics for constrained bitrate encoding applications for the user device. In another optional example, a recompressor system may be configured with computer readable instructions 605 that implement a method and/or system designed to determine an optimal number of B-frames for encoding a video.

In one embodiment, the processor routines 605 and data 606 are a computer program product, with an recompressor (generally referenced 605), including a computer readable medium capable of being stored on a storage device 606 which provides at least a portion of the software instructions for the recompressor/encoder/decoder.

The computer program product 605 can be installed by any suitable software installation procedure, as is well known in the art. In another embodiment, at least a portion of the encoder software instructions may also be downloaded over a cable, communication, and/or wireless connection. In other embodiments, the recompressor system software is a computer program propagated signal product embodied on a nontransitory computer readable medium, which when executed can be implemented as a propagated signal on a propagation medium (e.g., a radio wave, an infrared wave, a laser wave, a sound wave, or an electrical wave propagated over a global network such as the Internet, or other network(s)). Such carrier media or signals provide at least a portion of the software instructions for the present invention routines/program 605.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is transmitted over the propagation medium over a period of time, such as the instructions for a software application sent in packets over a network over a period of milliseconds, seconds, minutes, or longer. In another embodiment, the computer readable medium of computer program product 605 is a propagation medium that the computer system 501 may receive and read, such as by receiving the propagation medium and identifying a propagated signal embodied in the propagation medium, as described above for the computer program propagated signal product.

In an optional embodiment, example recompression/encoding techniques employed by the recompressor may be provided by the encoding techniques disclosed in the following which are incorporated by reference in their entirety: U.S. application Ser. No. 17/144,924, filed Jan. 8, 2021, now U.S. Pat. No. 11,350,105, issued May 31, 2022, which is a continuation of U.S. application Ser. No. 16/926,089, filed Jul. 10, 2020, now U.S. Pat. No. 11,159,801 issued Oct. 26, 2021, which is a continuation of U.S. application Ser. No. 16/420,796, filed May 23, 2019, now U.S. Pat. No. 10,757,419, issued Aug. 25, 2020, which is a continuation-in-part of International Application No. PCT/US2017/067413, which designated the United States and was filed on Dec. 19, 2017, and which claims the benefit of U.S. Provisional Application No. 62/452,265 filed on Jan. 30, 2017.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method of compressing and video media to a user device, the method comprising:
    loading, by a consumer, a video media on a device that performs a HTTP GET for an advertisement from an advertisement server;
    joining, by a demand side server an advertisement auction;
    bidding on and winning, by a demand side server, the advertisement auction;
    transmitting, via the demand side server or a supply side advertisement server, or any server transmitting video media to client devices, a recompression server API;
    passing a VAST URL to a recompression server and adding or updating a record in a cache with a key value pair;
    building and storing, by the recompression server, a new VAST XML and responding with a new VAST URL to the new VAST XML;
    transmitting, via the demand side server or supply side advertisement server, or any server transmitting video media, and filling in URL macro fields;
    transmitting, via the demand side server or supply side advertisement server, or any server transmitting video media, and responding to the device with a VAST URL;
    filling in, by the device, the macros on VAST URL and the HTTP headers with hardware and software information during a HTTP GET;
    performing, by the device, a HTTP GET on the VAST URL with macros;
    performing, via the VAST rewriter server, a check of the cache for a compressed ad with a key value pair;
    copying, by the server, macros to original VAST URL, enabling the demand server to be called;
    responding, via the demand advertisement server, with the original XML and/or a new advertisement video;

processing, via the VAST rewriting server, a VAST XML, and finding the mezzanine URL for recompression;
reading, via the VAST rewriting server, the cache to receive the replacement videos with the mezzanine URL;
determining, via the VAST rewriting server, if the cache is empty;
responding, via the VAST rewriting server, to the device with the original VAST XML and using the original VAST XML in the advertisement request;
performing, via the VAST rewriting server, a message queue to compress asynchronously;
getting, via the recompression server HTTP, the advertisement stream to be recompressed;
responding, via the demand CDN, with the advertisement stream and the recompression server starting compression of the advertisement;
posting, via the recompression server, the newly compressed advertisement stream(s) to the CDN;
updating, via the recompression server, the cache with the newly encoded video data with a key value pair;
performing, via the device, a HTTP GET advertisement stream with original advertisement video; and
streaming, via the device, the original uncompressed advertisement, enabling the consumer to view the original advertisement.

2. The method of claim 1, wherein the VAST XML regenerating process comprises of original VAST XML data, new VAST XML data, and original video while the new video is recompressed, reformatted, repackaged or transformed from on codec to another to be used in future ad requests.

3. The method of claim 1, wherein the VAST XML regenerating process comprises of original VAST XML data, new VAST XML data, and reformatted video, with different frame sizes, different bit rates, different codec, different containers, different stream protocols.

4. The method of claim 1, further comprising, VAST XML or VPAID Script or like protocol is used to communicate between components.

5. The method of claim 1, further comprising, various video and audio compression, packaging, and streaming protocols.

6. The method of claim 1, further comprising processing multiple unique ad videos associated with a single VAST/VPAID object.

7. A computer-implemented method of compressing and delivering video an ad or general video to a user device, comprising:
a consumer loading media on a device that performs a HTTP GET for an ad from an ad server;
demand side server, optionally, joins an ad auction and bids and wins the auction;
demand side server or supply side ad server or any server transmitting any kind of video to client devices calls a recompression server API and passes a VAST URL to a recompression server and that server adds or updates a record in a cache with a key value pair;
recompression server builds and stores a new VAST XML and responds with a new VAST URL to the new VAST XML;
demand side server or supply side ad server or any server transmitting any kind of video fills in URL macro fields;
demand side server or supply side ad server or any server transmitting any kind of video responds to the device with a VAST URL;
device fills in macros on VAST URL;
device fills in the HTTP headers with hardware and software information during a HTTP GET;
device performs a HTTP get on the VAST URL with macros;
VAST rewriter server performs a check of the cache for a compressed ad with a key value pair;
server copies macros to original VAST URL so that the demand server may be called;
demand ad server responds with original XML and optionally a new ad video; and
VAST rewriting server processes a VAST XML to find the mezzanine URL for recompression;
VAST rewriting server reads the cache to get the replacement videos with the mezzanine URL;
VAST rewriter server receives the cache data;
VAST rewriter uses the HTTP header info about the device's hardware and software capabilities to determine the optimum audio and video set respond with and server generates a new VAST XML with the replacement video;
VAST rewriter adds new XML, URLs and Scripting codes to the new vast tag for the purpose of video start, video impression, video clicks tracking and bandwidth determination; this information is used to optimize audio and video settings in subsequent advertisements for this device, spatially and temporally because connection speed varies spatially and temporally;
VAST rewriter dynamically changes what is included in the new XML, URLs and Scripting codes for the purpose of measuring video, network and device performance and applying statistical quantitative techniques;
VAST rewriter server response with VAST XML to the client; and
Client HTTP GETs the ad stream;
Client streams ad; and
Consumer sees ad, the recompressed, reformatted, repackaged ad that was cached.

8. The method of claim 7, wherein the VAST XML regenerating process comprises of original VAST XML data, new VAST XML data, and ad video new video recompressed, reformatted, repackaged or transformed from on codec to another.

9. The method of claim 7, wherein the HTTP header information about the device hardware and software is used to dynamically prepare the optimum audio video in terms of frame sizes, bit rates, codec, containers, streaming protocols.

10. The method of claim 7, wherein the VAST XML regenerating process comprises of original VAST XML data, new VAST XML data, and reformatted video, with different frame sizes, different bit rates, different codec, different containers, different stream protocols.

11. The method of the claim 7, wherein the VAST XML and VPAID Script or like protocols are used to dynamically add additional video start, video impression, video click tracking and how this information can be used to optimize subsequent ads to further optimized.

12. The method of claim 7, further comprising, VAST XML or VPAID Script or like protocol is used to communicate between components.

13. The method of claim 7, further comprising, various video and audio compression, packaging, and streaming protocols.

14. The method of claim 7, further comprising processing multiple unique ad videos associated with a single VAST/VPAID object.

15. A codec system comprising;
a client device configured to communicate via a session handler with at least one server in a content delivery network;
the at least one server configured to deploy a first video encoding to the client device via a first VAST tag transmitted via the session handler to the client device;
a recompressor system configured to process the first VAST tag to identify the first video encoding;
the recompressor system configured to recompress the first video encoding using bitrate encoding quality metrics to dynamically optimize the first video encoding for the client device such that the first video encoding is transformed into a first mezzanine encoding;
the recompressor system configured to dynamically reconfigure the first VAST tag resulting in a transformed vast tag identifying the first mezzanine encoding while preserving information about the client device from the VAST tag including existing VAST and VPAID data elements so that all tracking information is preserved; and
the at least one server configured to respond to a request to deploy the first video encoding to the client by verifying that the first video encoding is in the video cache of the CDN and responding by forwarding the transformed VAST tag identifying the first mezzanine encoding to the client device via the session handler; and
the client device be configured to respond to the transformed VAST tag by processing at least a portion of the first mezzanine encoding via the transformed VAST tag.

16. The codec system of claim 15 wherein recompressor system identifies ad proxy server in the CDN having a geographic location near a physical location of the client device to improve content delivery speed at the client device of the first video encoding with a highest resolution resulting in the first mezzanine encoding.

17. The codec system of claim 16 wherein the recompressor system is stored on a non-transitory computer readable medium, the recompressor system is configured to be executed by at least one computer processor, causing the computer processor to perform bitrate encoding of the first video encoding, where the bitrate encoding includes determining an optimal quality metrics for bitrate encoding, the recompressor optionally performing bitrate encoding on the first video encoding by:
computationally processing a plurality of perceptual quality metrics, a plurality of statistical models, a desired mean opinion score (MOS), and a mean opinion score (MOS) prediction error limit;
deriving, from perceptual quality metrics, a first subset of the plurality of statistical models, and first subset of at least one the initial encodings, a first derived model that predicts mean opinion scores (MOS);
using the first derived model, the first subset of the plurality of perceptual quality metrics, the first subset of the plurality of statistical models, and a first subset of the initial encodings, computationally determining first model bitrates that are proximate to the desired mean opinion score (MOS);
computing, for the first subset of the plurality of the perceptual quality metrics, for the first subset of the plurality of statistical models, and for the first video encoding, a first subset of bitrate errors representing a difference between a respective model bitrate and the respective corresponding true bitrate of the first video encoding;
computing, for the first subset of the plurality of perceptual quality metrics and the first subset of the plurality of statistical models, an average bitrate savings across at least a portion of the encoded true bitrate videos, the average bitrate savings calculated by comparing the respective model bitrate to the respective corresponding true bitrate of first video encoding;
comparing respective further subsets from the plurality of perceptual quality metrics and the plurality of statistical models with the first subset of the plurality of perceptual quality metrics and the first subset of the plurality of statistical models, respectively, to determine an optimal subset of at least one of the perceptual quality metrics from the plurality of the perceptual quality metrics and at least one of the plurality of statistical models, which produce the largest average bitrate savings, while incurring substantially no absolute mean opinion scores (MOS) prediction errors greater than the mean opinion scores (MOS) prediction error limit; and
wherein, the optimal subset produces a predicted mean opinion scores (MOS) close to the desired mean opinion scores (MOS) and maximizes the average bitrate savings subject to a constraint on the mean opinion scores (MOS) prediction error being less than the mean opinion score (MOS) prediction error limit.

18. The codec system of claim 16, wherein the plurality of statistical models are derived from at least one of: machine learning or statistical modeling.

* * * * *